United States Patent
Tomioka et al.

(10) Patent No.: US 6,845,011 B2
(45) Date of Patent: Jan. 18, 2005

(54) ELECTRONIC APPARATUS HAVING A CIRCULATION PATH OF LIQUID COOLANT TO COOL A HEAT-GENERATING COMPONENT

(75) Inventors: Kentaro Tomioka, Sayama (JP); Katsumi Hisano, Kashiwa (JP); Tomonao Takamatsu, Tokyo (JP); Mitsuyoshi Tanimoto, Sagamihara (JP); Hiroyuki Kusaka, Ome (JP); Teruo Kinoshita, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/651,788

(22) Filed: Aug. 29, 2003

(65) Prior Publication Data

US 2004/0070940 A1 Apr. 15, 2004

(30) Foreign Application Priority Data

Oct. 15, 2002 (JP) ........................... 2002-300929

(51) Int. Cl.[7] .................... H05K 7/20; H01L 23/473
(52) U.S. Cl. .................. 361/699; 361/698; 257/714; 165/80.4
(58) Field of Search ........................ 361/699, 688, 361/698, 700; 257/714, 715; 165/80.4

(56) References Cited

U.S. PATENT DOCUMENTS

| 5,323,847 | A | * | 6/1994 | Koizumi et al. | 165/104.33 |
|---|---|---|---|---|---|
| 5,383,340 | A | * | 1/1995 | Larson et al. | 62/259.2 |
| 5,606,341 | A | * | 2/1997 | Aguilera | 345/87 |
| 5,646,824 | A | * | 7/1997 | Ohashi et al. | 361/699 |
| 5,731,954 | A | * | 3/1998 | Cheon | 361/699 |
| 5,847,925 | A | * | 12/1998 | Progl et al. | 361/687 |
| 6,166,907 | A | * | 12/2000 | Chien | 361/699 |
| 6,250,378 | B1 | * | 6/2001 | Kobayashi | 165/104.33 |
| 6,510,052 | B2 | | 1/2003 | Ishikawa et al. | |
| 6,519,148 | B2 | * | 2/2003 | Nakagawa et al. | 361/687 |
| 6,556,439 | B2 | * | 4/2003 | Shibasaki | 361/687 |
| 6,725,682 | B2 | * | 4/2004 | Scott | 62/259.2 |
| 6,741,464 | B2 | * | 5/2004 | Kitano et al. | 361/687 |
| 6,771,498 | B2 | * | 8/2004 | Wang et al. | 361/687 |

FOREIGN PATENT DOCUMENTS

| CN | 1339942 A | 3/2002 | |
|---|---|---|---|
| JP | 7-142886 | 6/1995 | |
| JP | 2002014747 | 1/2002 | |
| JP | 2002-151638 | 5/2002 | |
| JP | 2003303034 A | * 10/2003 | ............. G06F/1/20 |

OTHER PUBLICATIONS

Chinese Patent Office First Office Action Dated Aug. 27, 2004.

* cited by examiner

*Primary Examiner*—Anatoly Vortman
(74) *Attorney, Agent, or Firm*—Pillsbury Winthrop LLP

(57) ABSTRACT

An electronic apparatus includes a first housing and a second housing. The first housing incorporates a pump. The second housing incorporates a heat-radiating portion. The pump has a heat-receiving portion. A circulation path for circulating liquid coolant connects the pump and the heat-radiating portion. The circulation path has two pipes. The first pipe connects the pump to the coolant inlet port of the heat-radiating portion. The second pipe connects the pump to the coolant outlet port of the heat-radiating portion. The first and second pipes extend from two adjacent points on the pump, toward a midpoint between the coolant inlet port and coolant outlet port.

16 Claims, 6 Drawing Sheets

ELECTRONIC APPARATUS HAVING A
CIRCULATION PATH OF LIQUID COOLANT
TO COOL A HEAT-GENERATING
COMPONENT

CROSS-REFERENCE TO RELATED
APPLICATIONS

This application is based upon and claims the benefit of priority from prior Japanese Patent Application No. 2002-300929, filed Oct. 15, 2002.

BACKGROUND OF THE INVENTION

1. Field of the Invention

The present invention relates to an electronic apparatus of the liquid-cooled type, in which a heat-generating component such as a CPU is cooled with liquid coolant. More particularly, the invention relates to a structure of a circulation path of the liquid coolant.

2. Description of the Related Art

A CPU is incorporated in, for example, notebook-type portable computers. The heat that the CPU generates while operating is increasing as its data-processing speed rises, and it performs more and more functions. The higher the temperature of the CPU, the less efficiently it operates. To cool the CPU, so-called cooling systems of the liquid-cooling type have been developed in recent years. A liquid-cooling system uses a liquid coolant that has a far higher specific heat than air.

Japanese Patent Application KOKAI Publication No. 7-142886 discloses a cooling system of the liquid-cooling type, configured for use in portable computers. The cooling system comprises a heat-receiving header, a heat-radiating header, and a tube for circulating the coolant. The heat-receiving header is provided in the housing of a portable computer and thermally connected to the CPU incorporated in the housing. The heat-radiating header is provided in the display unit of the portable computer. The tube extends from the housing to the display unit of the portable computer. It connects the heat-receiving header and the heat-radiating header. Liquid coolant is circulated between the heat-receiving header and the heat-radiating header.

In this cooling system, the liquid coolant in the heat-receiving header absorbs the heat generated by the CPU. That is, the coolant is heated in the heat-receiving header. The coolant thus heated is transferred via the tube into the heat-radiating header. The heat-radiating header radiates the heat generated by the CPU, as the coolant flows through it. The coolant is therefore cooled in the heat-radiating header. The coolant thus cooled is transferred via the tube, back into the heat-receiving header through the tube. Back in the heat-receiving header, the coolant again absorbs the heat from the CPU. As the coolant is thus circulated, the heat is transmitted from the CPU to the heat-radiating header with high efficiency and the heat-radiating head radiates the heat. This cooling enhances the efficiency of cooling the CPU.

In the conventional cooling system, the tube through which the liquid coolant flows extends between the housing and display unit of the computer. The display unit is coupled to the housing and can rotate. To allow the display unit to rotate smoothly, the tube is made of synthetic resin having sufficient flexibility. Since the tube is made of synthetic resin, the liquid coolant inevitably leaks, and passes through the tube and eventually evaporates. To reduce the wasting of the coolant due to its evaporation outside the tube, it is desirable to make the tube as short as possible.

In the conventional cooling system, however, the tube coupled to the heat-receiving header meanders, passing around various functional components provided in the housing of the computer. The tube is therefore very long. Consequently, the liquid coolant evaporates from the tube in large quantities. The coolant liquid must be replenished or replaced with fresh coolant very frequently. The maintenance of the cooling system requires much labor and time. If the coolant is not replenished, the efficiency of cooling the CPU will decrease to impair the reliability of the cooling system.

BRIEF SUMMARY OF THE INVENTION

According to an embodiment of the present invention, an electronic apparatus includes a first housing incorporating a heat-generating component. A second housing is coupled to the first housing. A pump is incorporated into the first housing. The pump has a heat-receiving portion thermally connected to the heat-generating component. A heat-radiating portion is incorporated into the second housing. The heat-radiating portion radiates heat generated by the heat-generating component and has a coolant inlet port and a coolant outlet port. A circulation path circulates a liquid coolant between the pump and the heat-radiating portion. The circulation path has a first pipe connecting the pump to the coolant inlet port of the heat-radiating portion and a second pipe connecting the pump to the coolant outlet port of the heat-radiating portion. The first pipe and the second pipe extend from two adjacent points on the pump, toward a midpoint between the coolant inlet port and the coolant outlet port.

BRIEF DESCRIPTION OF THE SEVERAL
VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION

Figure 1:
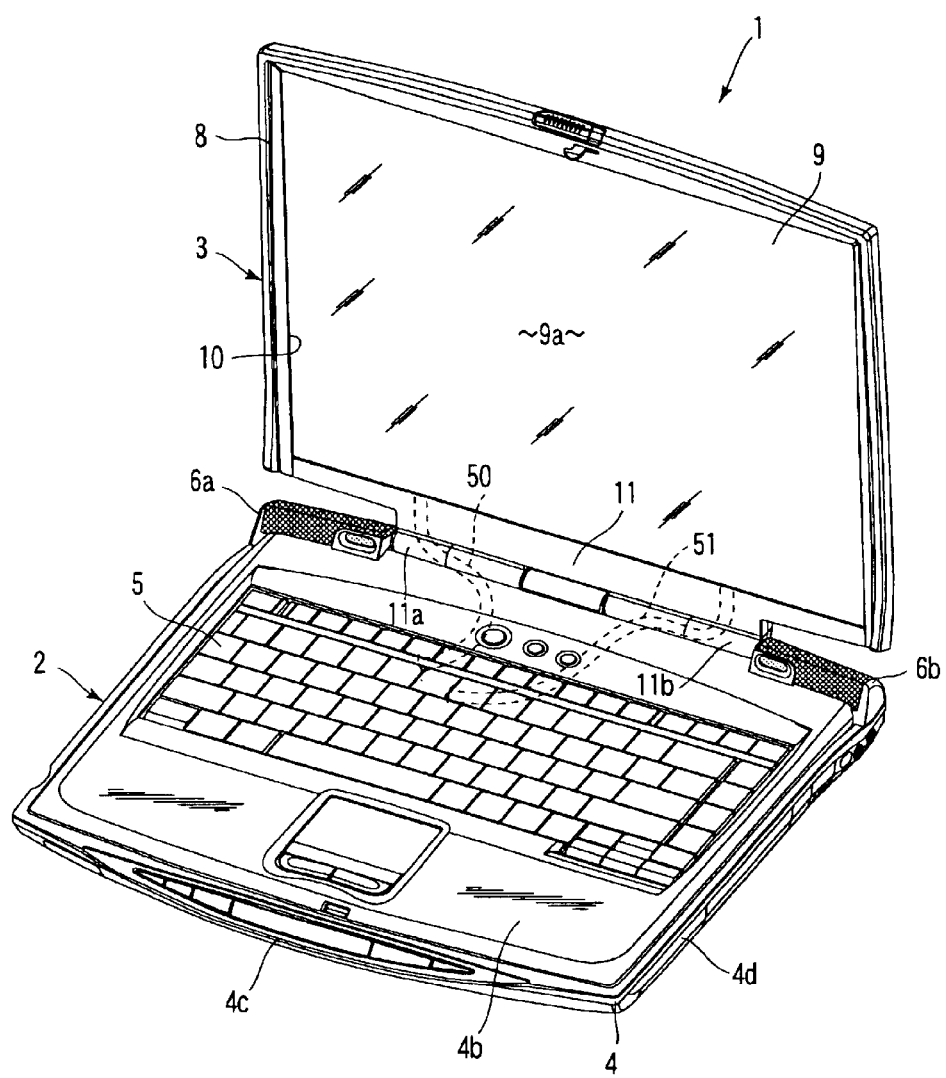
FIG. 1 is a perspective view of a portable computer according to the first embodiment of the present invention.
Figure 2:
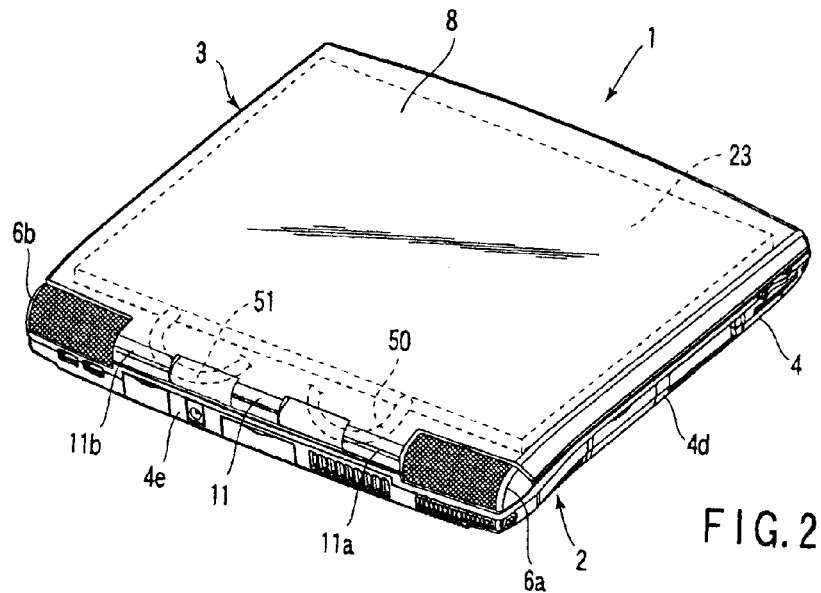
FIG. 2 is a perspective view of the portable computer according to the first embodiment, illustrating the positional relation of the heat-radiating portion and the display housing.

The first embodiment of this invention will be described, with reference to FIGS. 1 to 7.

FIGS. 1 to 4 show a portable computer 1, or an electronic apparatus according to this invention. The portable computer 1 comprises a computer main unit 2 and a display unit 3. The computer main unit 2 has a housing 4 that is shaped like a flat box. The housing 4 comprises a bottom wall 4a, a top wall 4b, a front wall 4c, left and right sidewalls 4d, and a back wall 4e. The top wall 4b supports a keyboard 5. The top wall 4b has a pair of projections 6a and 6b. The projections 6a and 6b lie behind the keyboard 5 and are spaced apart in the width direction of the housing 4.

The display unit 3 comprises a display housing 8 and a liquid crystal display panel 9 incorporated in the display housing 8. The display housing 8 is shaped like a flat box and has a rectangular opening 10 in the front. The liquid crystal display panel 9 has a screen 9a that can display images. The screen 9a is exposed outside the housing 8 through the opening 10.

Figure 4:
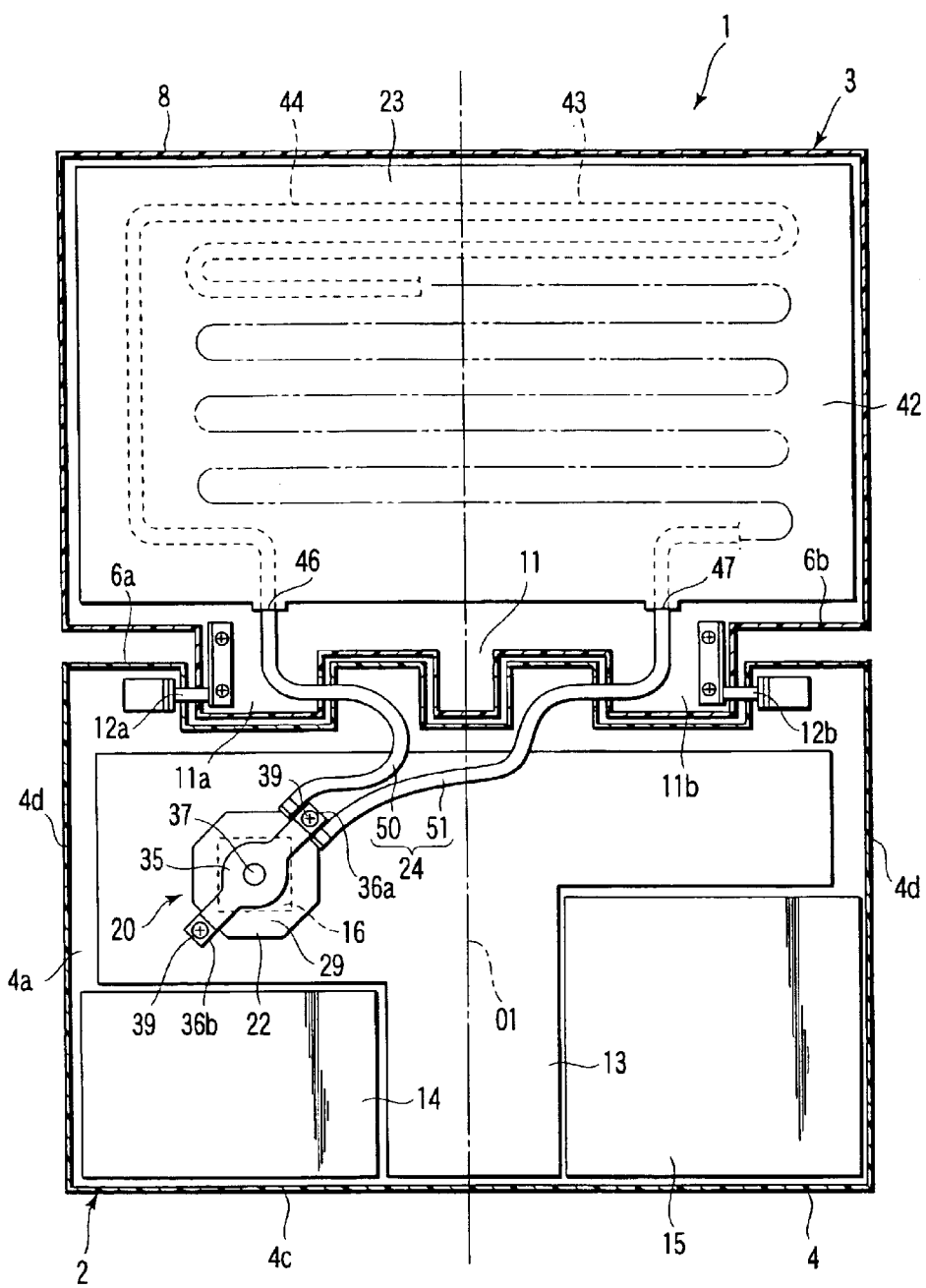
FIG. 4 is a cross-sectional view of the portable computer according to the first embodiment, also showing the first and second tubes that connect the pump and the heat-radiating portion.

The display housing 8 has a hollow leg 11. As FIG. 4 shows, the leg 11 is continuous to the interior of the display housing 8. The leg 11 protrudes from the lower edge of the display housing 8 and lies between the projections 6a and 6b of the housing 4. The leg 11 has two end portions 11a and 11b. The first end portion 11a and the second end portion 11b lie adjacent to the projections 6a and 6b of the housing 4, respectively.

A pair of hinges 12a and 12b couples the leg 11 to the rear edge of the housing 4. The first hinge 12a connects the first projection 6a of the housing 4 and the first end portion 11a of the leg 11. The second hinge 12b connects the second projection 6b of the housing 4 and the second end portion 11b of the leg 11. Thus, the display unit 3 is coupled to the housing 4 and can be rotated between a closed position and an opened position. At the closed position, the display unit 3 lies over the housing 4, covering the keyboard 5. At the opened position, the display unit 3 stands up at the rear edge of the housing 4, exposing the keyboard 5 and the liquid crystal display panel 9.

The housing 4 contains a printed circuit board 13, a hard disk drive 14, and a CD-ROM drive 15. The board 13, hard disk drive 14 and CD-ROM drive 15 are secured on the bottom wall 4a of the housing 4.

Figure 5:
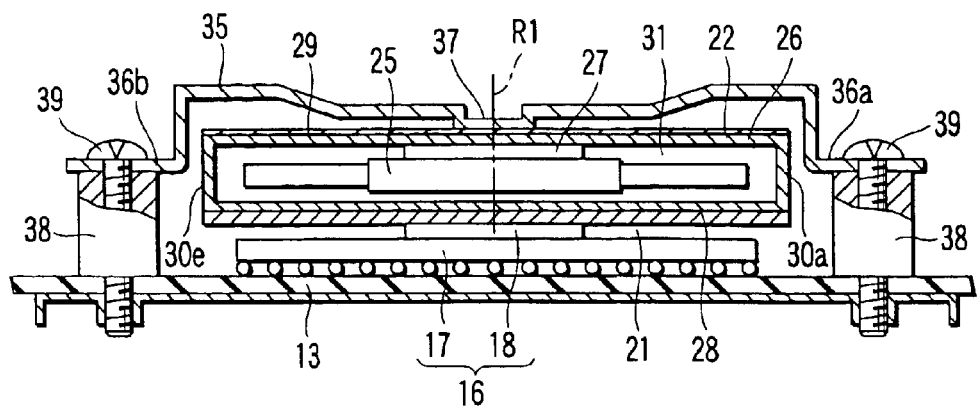
FIG. 5 is a cross-sectional view, depicting the pump having a heat-receiving portion, which is supported by a support member and fixed on the printed circuit board.

As FIG. 5 shows, a CPU 16 as a heat-generating component is mounted on the printed circuit board 13. The CPU 16 is, for example, a semiconductor package of the ball grid array (BGA) type. The CPU 16 is located closer to the left side of the housing 4 than to the middle part thereof. It has a base 17 and an IC chip 18 mounted on the center part of the base 17. The IC chip 18 generates much heat as it operates, processing data at high speeds and performing many functions. The IC chip 18 needs to be cooled to keep operating in stable conditions.

Figure 3:
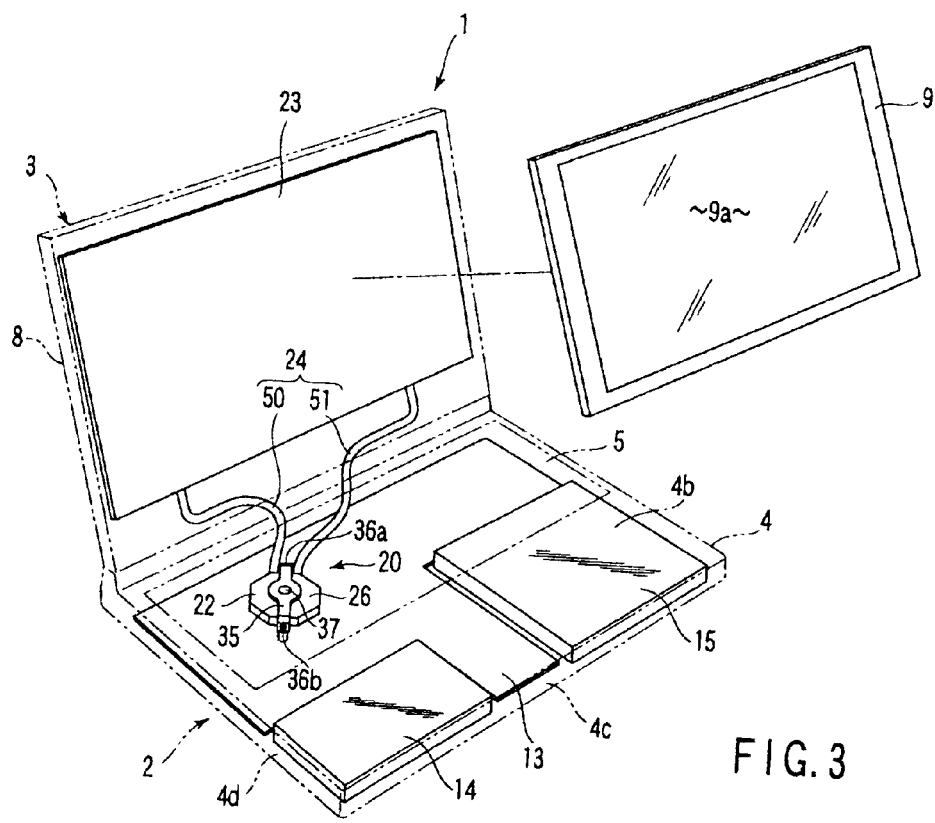
FIG. 3 is a perspective view of the portable computer according to the first embodiment, schematically showing the first and second tubes that connect the pump and the heat-radiating portion.

As shown in FIGS. 3 and 4, the portable computer 1 further comprises a cooling unit 20 of the liquid-cooling type. The cooling unit 20 comprises a heat-receiving portion 21 (see FIG. 5), a pump 22, a heat-radiating portion 23, and a circulation path 24.

The heat-receiving portion 21 is a metal plate larger than the base 17 of the CPU 16 as illustrated in FIG. 5. It covers the IC chip 18 from above. Heat-conductive grease fills the gap between the heat-receiving portion 21 and the IC chip 18, thermally connecting the IC chip 18 to the lower surface of the heat-receiving portion 21.

The pump 22 is formed integral with the heat-receiving portion 21. The pump 22 comprises an impeller 25 and a pump housing 26. The impeller 25 is connected to a flat motor 27, which is supported on the pump housing 26. The axis R1 of the impeller 25 extends in the direction of thickness of the housing 4. The flat motor 27 starts rotating the impeller 25 when the power switch to the portable computer 1 is closed (i.e., when the power is "on") or when the temperature of the CPU 16 rises to a preset value.

The pump housing 26 is shaped like a flat box. It is made of heat-conductive metal such as aluminum alloy. It has a bottom wall 28, a top wall 29, and eight sidewalls 30a to 30h. The walls 28, 29 and 30a to 30h constitute a pump chamber 31. The pump chamber 31 contains the impeller 25.

Figure 6:
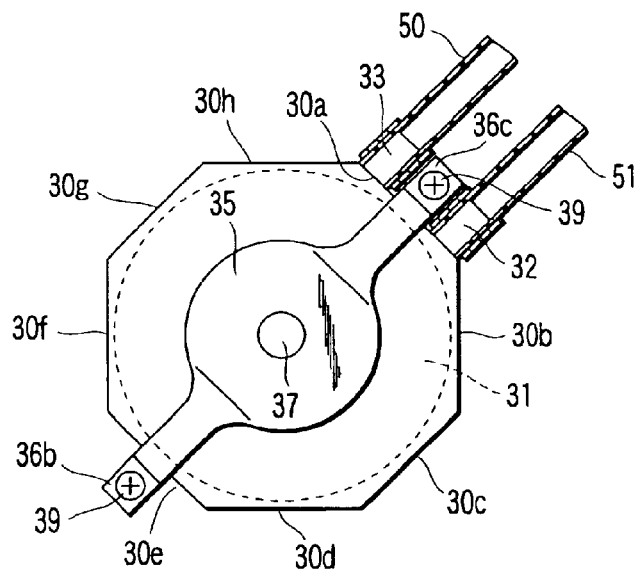
FIG. 6 is a plan view of the pump incorporated in the first embodiment of the present invention.

The bottom wall 28 of the pump housing 26 is laid on the upper surface of the heat-receiving portion 21. The bottom wall 28 is therefore thermally connected to the heat-receiving portion 21. The first to eighth sidewalls 30a to 30h are arranged, surrounding the impeller 25 and connecting the edges of the bottom wall 28 to the edges of the top wall 29. The sidewalls 30a to 30h extend in lines tangential to the circumference of the impeller 25. Thus, the pump housing 26 looks like a regular octagon as viewed from the axis R1 of the impeller 25, as is illustrated in FIG. 6.

The pump housing 26 has a coolant inlet port 32 and a coolant outlet port 33. The ports 32 and 33 horizontally extend from the first sidewall 30a of the pump housing 26. They extend parallel to each other and are spaced apart from each other.

A support member 35 fastens the pump 22 to the upper surface of the printed circuit board 13. The support member 35 is a leaf spring and can elastically deform. It opposes the top wall 29 and extends in the diameter of the pump housing 26.

The support member 35 has a pair of legs 36a and 36b and a pushing projection 37. The first leg 36a has been formed by bending one end portion of the member 35 downwards. The second leg 36b has been formed by bending the other end portion of the member 35 downwards. Both legs 36a and 36b are bent, having an L-shaped cross section. The pushing projection 37 lies at the center of the support member 35 and protrudes downwards.

Screws 39 fasten the legs 36a and 36b of the support member 35 to a pair of stud pins 38 that are secured to the printed circuit board 13. Since the legs 36a and 36b are so fastened to the board 13, the pushing projection 37 abuts on the top wall 29 of the pump housing 26. The projection 37 pushes the heat-receiving portion 21 onto the CPU 16. This is because the portion 21 is formed integral with the pump housing 26. As a result, both the heat-receiving portion 21 and the pump 22 are held on the printed circuit board 13.

As FIG. 6 shows, the first leg 36a of the support member 35 is interposed between the coolant inlet port 32 and coolant outlet port 33 of the pump 22. Thanks to this arrangement, the coolant inlet port 32 or the coolant outlet port 33 abuts on the first leg 36a of the support member 35 when the pump 22 moves in the circumferential direction of the pump housing 26. Thus, the second leg 36a serves as a stopper to restrict the motion of the pump 22.

As FIG. 4 depicts, the pump 22 is offset leftwards from the axis O1 of depth of the housing 4, or a line that passes the midpoint in the width of the housing 4. The axis O1 goes across the center of the leg 11 of the display housing 8, which is coupled to the housing 4.

The coolant inlet port 32 and coolant outlet port 33 of the pump 22 extend backward and slantwise from the first sidewall 30a of the pump housing 26. Thus, they are directed toward the middle part of the junction between the display housing 8 and the housing 4. The ports 32 and 33 incline to the axis O1 of depth of the housing 4.

Figure 7:
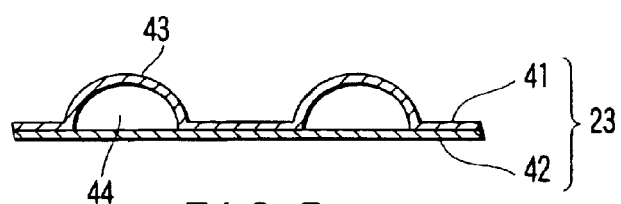
FIG. 7 is a cross-sectional view of the heat-radiating portion provided in the first embodiment of the invention.

As shown in FIGS. 3 and 4, the heat-radiating portion 23 of the cooling unit 20 lies between the back of the display housing 8 and the liquid crystal display panel 9. The heat-radiating portion 23 is a rectangular plate that has almost the same size as the liquid display panel 9. As FIG. 7 shows, the heat-radiating portion 23 comprises two heat-radiating plates 41 and 42. Both heat-radiating plates 41 and 42 are made of metal that excels in heat conductivity. They are laid, one upon the other.

The first heat-radiating plate 41 has a recess 43. The recess 43 opens to the second heat-radiating plate 42. It meanders, covering almost the entire first heat-radiating plate 41. The second heat-radiating plate 42 closes the recess 43. Hence, the recess 43 serves as a coolant path 44, which is defined by the first heat-radiating plate 41 and the second heat-radiating plate 42.

The heat-radiating portion 23 has a coolant inlet port 46 and a coolant outlet port 47. The ports 46 and 47 oppose the leg 11 of the display housing 8. They are arranged symmetrical with respect to the axis O1 of depth of the housing 4, located on the left and right sides of the axis O1, respectively. More specifically, the coolant inlet port 46 is located at the left edge of the heat-radiating portion 23 and is connected to the upstream end of the coolant path 44. The coolant outlet port 47 is located at the right edge of the heat-radiating portion 23 and is connected to the downstream end of the coolant path 44.

As FIG. 4 illustrates, the coolant inlet port 32 and coolant outlet port 33 of the pump 22 protrude backwards from the first sidewall 30a of the pump housing 26 and incline to the axis O1. Therefore, the ports 32 and 33 extend toward the midpoint between the coolant inlet port 46 and coolant outlet port 47 of the heat-radiating portion 23.

The circulation path 24 that is provided in the cooling unit 20 comprises two pipes 50 and 51. The first pipe 50 connects the coolant outlet port 33 of the pump 22 to the coolant inlet port 46 of the heat-radiating portion 23. The first pipe 50 first extends in the direction the coolant outlet port 33 protrudes, thus reaching the rear edge of the housing 4, then passes through the first end portion 11a of the leg 11, and finally reaches the left side of the display housing 8.

The second pipe 51 of the circulation path 24 connects the coolant output port 47 of the heat-radiating portion 23 to the coolant inlet port 32 of the pump 22. The pipe 51 first extends in the direction the coolant inlet port 32 protrudes, thus reaching the rear edge of the housing 4, then passes through the second end portion 11b of the leg 11, and finally reaches the right side of the display housing 8.

Hence, the first pipe 50 and second pipe 51 that constitute the coolant path 24 extend from the pump 22, neither parallel to the axis O1 nor perpendicular thereto, as is clearly seen from FIG. 4.

The first pipe 50 and second pipe 51 are tubes that are made of rubber or synthetic resin, either being flexible material. Made of flexible material, the pipes 50 and 51 deform when the pump 22 and the heat-radiating portion 23 move relative to each other as the display unit 3 is rotated. Thus, the pipes 50 and 51 can absorb the twisting of the circulation path 24 that occurs every time the display unit 3 is rotated.

The pump chamber 31 of the pump 22, the coolant path 44 of the heat-radiating portion 23, and the circulation path 24 are filled with liquid coolant (or cooling medium). The liquid coolant is, for example, an antifreeze prepared by an ethylene glycol solution and, if necessary, a corrosion inhibitor, to water.

In the first embodiment described above, the IC chip 18 of the CPU 16 generates heat while the portable computer 1 is being used. The heat that the IC chip 18 generates is transferred via the heat-receiving portion 21 to the bottom wall 28 of the pump housing 26. As indicated earlier, the pump chamber 31 of the pump housing 26 is filled with the liquid coolant. Therefore, the liquid coolant absorbs a greater part of the heat that has been transferred to the pump housing 26.

When the impeller 25 of the pump 22 rotates, the liquid coolant is forced to the heat-radiating portion 23 through the first pipe 50. The liquid coolant is made to circulate between the pump 31 and the heat-radiating portion 23. More precisely, the liquid coolant heated in the pump chamber 31 is guided to the heat-radiating portion 23 through the first pipe 50 and then flows through the meandering coolant path 44. While flowing through the coolant path 44, the liquid coolant releases the heat. The heat diffuses in the first heat-radiating plate 41 and second heat-radiating plate 42. The plates 41 and 42 radiate the heat from their surfaces.

Therefore, the liquid coolant is cooled as it passes through the liquid path 44 and supplied back into the pump chamber 31 of the pump 22. This cooling cycle is repeated. As a result, the heat is transferred from the IC chip 18 to the heat-radiating portion 23 provided in the display housing 8 and is released from the portable computer 1 via the heat-radiating portion 23.

In the cooling unit 20, the first and second pipes 50 and 51, both connected to the pump 22, extend from the first side wall 30a of the pump housing 26, backwards and slantwise with respect to the pump 22. Thus, the pipes 50 and 51 are oriented toward the midpoint of the function between the housing 4 and the display housing 8. Therefore, they only need to run a shortest possible distance to be connected to the coolant inlet port 46 and the coolant outlet port 47, respectively, though the pump 22 is offset to the left from the axis O1 of depth of the housing 4. Hence, the pipes 50 and 51 are shorter than otherwise.

As a result, the evaporation of the liquid coolant from the pipes 50 and 51 can be minimized, in spite of the fact that the pipes 50 and 51 are made of rubber or synthetic resin. This renders it unnecessary for a long time to replenish the liquid coolant or replaced the same with fresh liquid coolant. That is, the cooling unit 20 need not be inspected so frequently to maintain it in good condition.

The more the evaporation of the liquid coolant is controlled, the more effectively the heat can be transferred from the CPU 16 to the heat-radiating portion 23, for a long period of time. The efficiency of cooling of the CPU 16 can therefore remain high for a long time. Thus, the coolant unit 20 can cool the CPU 16 with high reliability.

Figure 8:
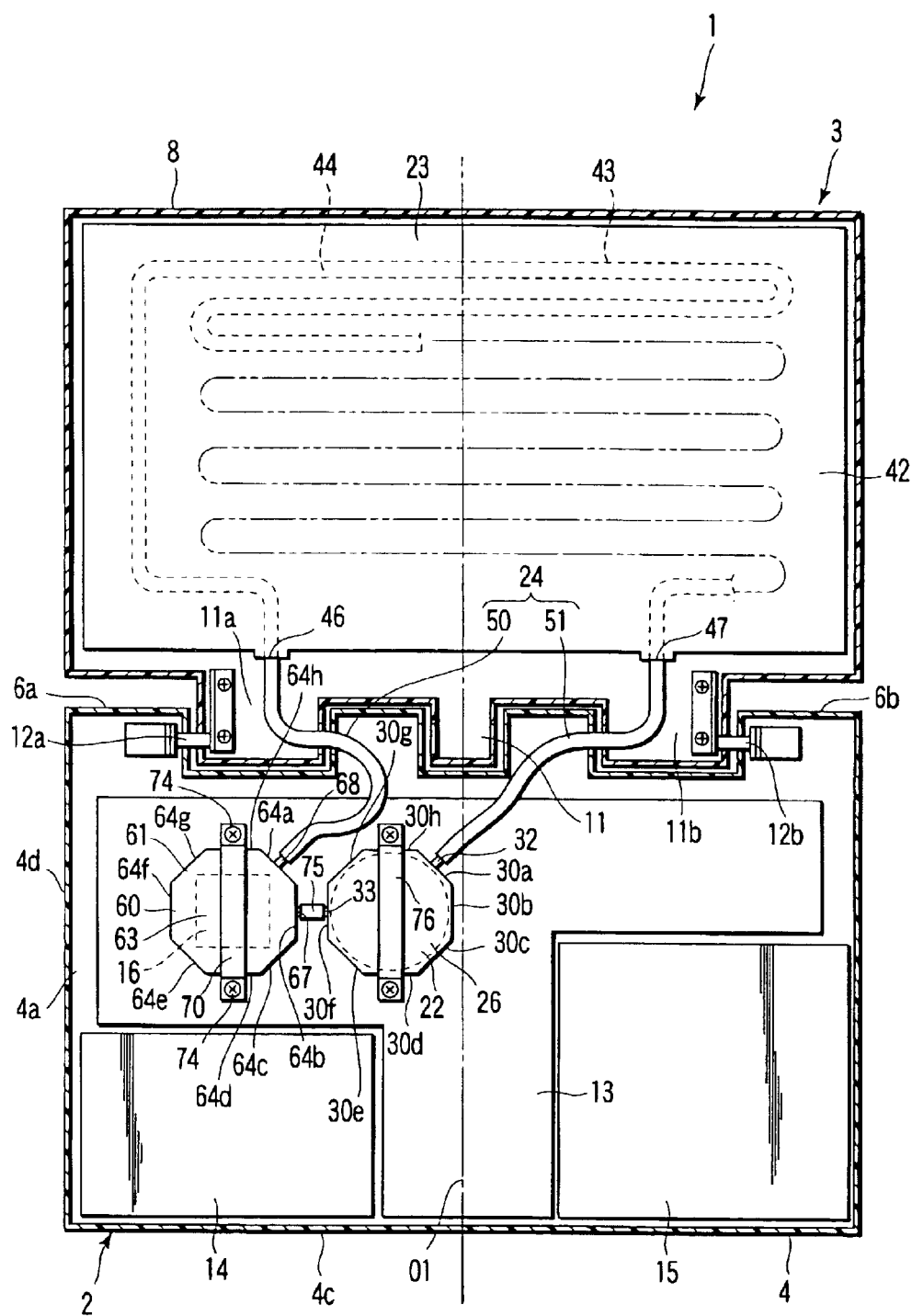
FIG. 8 is a cross-sectional view of a portable computer according to the second embodiment of the present invention, illustrating the positional relation between the heat-receiving portion, pump, heat-radiating portion and circulation path.
Figure 9:
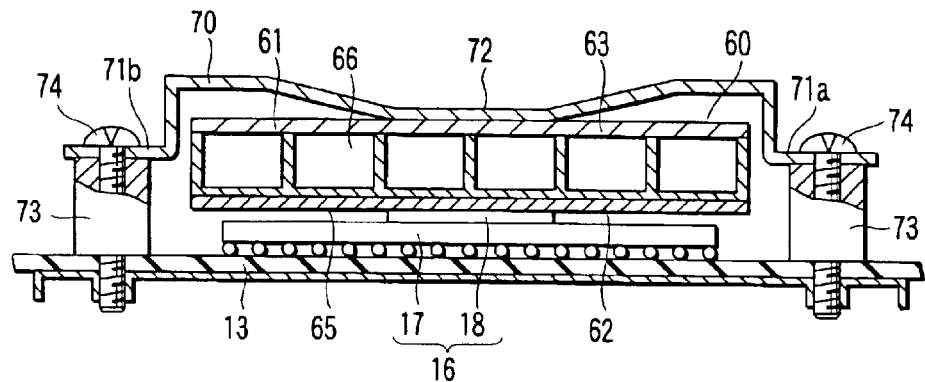
FIG. 9 is a cross-sectional view of the second embodiment, showing the heat-radiating portion that is supported by a support member and fixed on the printed circuit board.
Figure 10:
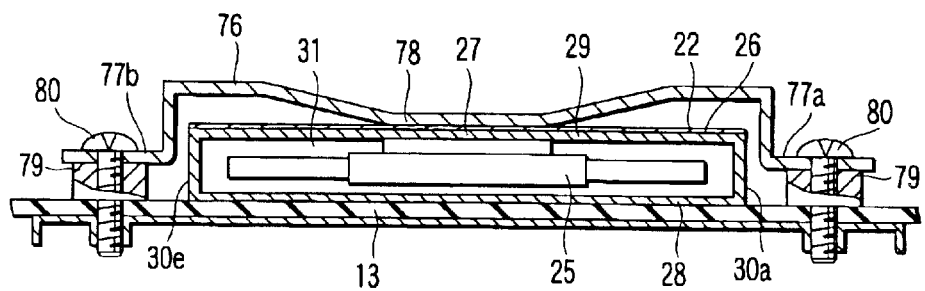
FIG. 10 is a cross-sectional view of the second embodiment, depicting the pump that is supported by a support member and fixed on the printed circuit board.

The present invention is not limited to the first embodiment described above. FIGS. 8 to 10 illustrate the second embodiment of the invention.

The second embodiment differs from the first embodiment in that a heat-receiving portion 60 that receives the heat from the CPU 16 is spaced away from the pump 22. In any other respect, the second embodiment is identical to the first embodiment in terms of basic structure. The components similar or identical to those of the first embodiment are designated with the same reference numerals and will not be described again in detail.

As FIGS. 8 and 9 show, the heat-receiving portion 60 has a housing 61 that is shaped like a flat box. The housing 61 is made of heat-conductive metal such as aluminum alloy. It has a bottom wall 62, a top wall 63, and eight sidewalls 64a to 64h. The bottom wall 62 has a flat lower surface, which serves as a heat-receiving surface 65. Heat-conductive grease (not shown) fills the gap between the heat-receiving surface 65 and the IC chip 18 of the CPU 16, thermally connecting the heat-receiving portion 60 to the IC chip 18. The first to eight sidewalls 64a to 64h connect the edges of the bottom wall 62 to those of the top wall 63. The walls 62, 63 and 64a to 64h constitute a coolant path 66 within the housing 61. Coolant liquid can flow through the coolant path 66. The coolant path 66 is thermally connected to the IC chip 18 by the bottom wall 62.

The first to eighth sidewalls 64a to 64h are arranged, surrounding the coolant path 66. Thus, the housing 61 looks like a regular octagon as viewed from above.

The housing 61 has a coolant inlet port 67 and a coolant outlet port 68. The coolant inlet port 67 is made in the second sidewall 64b and protrudes from the second side all 64b toward the left side of the housing 4. The coolant outlet port 68 is made in the first sidewall 64a. This port 68 protrudes from the first sidewall 64a, backwards and slantwise toward a midpoint between the coolant inlet port 46 and coolant outlet port 47 of the heat-radiating portion 23.

The coolant outlet port 68 of the heat-receiving portion 60 is connected to the coolant inlet port 46 of the heat-radiating portion 23 by the first pipe 50 of the circulation path 24. The first pipe 50 first extends in the direction the coolant outlet port 68 protrudes, thus reaching the rear edge of the housing 4, then passes through the first end portion 11a of the leg 11, and finally reaches the left side of the display housing 8.

As seen from FIG. 9, the housing 61 of the heat-receiving portion 60 is secured on the upper surface of the printed circuit board 13 by a support member 70. The support member 70 is a leaf spring and can elastically deform. It opposes the top wall 63 of the housing 61 and extends in the diameter of the housing 61.

The support member 70 has a pair of legs 71a and 71b and a pushing part 72. The first leg 71a has been formed by bending one end portion of the member 70 downwards. The second leg 71b has been formed by bending the other end portion of the member 70 downwards. Both legs 71a and 71b have an L-shaped cross section. The pushing part 72 lies at the center of the support member 70 and protrudes downwards.

Screws 74 fasten the legs 71a and 71b of the support member 70 to a pair of stud pins 73 that are secured to the printed circuit board 13. Since the legs 71a and 71b are so fastened to the board 13, the pushing part 72 abuts on the center part of the top wall 63 of the housing 61. The part 72 pushes the heat-receiving surface 65 of the housing 61 onto the CPU 16. As a result, the heat-receiving portion 60 is held on the printed circuit board 13, covering the CPU 16 from above.

As FIG. 8 depicts, the pump 22 is offset leftwards from the axis O1 of depth of the housing 4 and located adjacent to the heat-receiving portion 60. The pump 22 and the heat-receiving portion 60 lie side by side. The pump housing 26 of the pump 22 has a shape of a regular octagon as in the first embodiment. The coolant inlet port 32 of the pump 22 is made in the first sidewall 30a of the pump housing 26. It projects backward and slantwise from the first sidewall 30a of the pump housing 26. Thus, it extends toward a midpoint between the coolant inlet port 46 and coolant outlet port 47 of the heat-radiating portion 23. The coolant inlet port 32 extends in the same direction as the coolant outlet port 68 of the heat-receiving portion 60 does.

The coolant inlet port 32 of the pump 22 is connected to the coolant outlet port 47 of the heat-radiating portion 23 by the second pipe 51 of the circulation path 24. The second pipe 51 first extends in the direction the coolant inlet port 32 protrudes, thus reaching the rear edge of the housing 4, then passes through the second end portion 11b of the leg 11, and finally reaches the right side of the display housing 8.

The coolant outlet port 33 of the pump 22 is made in the sixth sidewall 30f of the pump housing 26. The port 33 extends from the sixth sidewall 30f toward the left side of the housing 4. A relay pipe 75 connects the coolant outlet port 33 to the coolant inlet port 67 of the heat-receiving portion 60.

As FIG. 10 shows, the pump 22 is secured on the upper surface of the printed circuit board 13 by a support member 76, in a region outside the CPU 16. The support member 76 is a leaf spring and can elastically deform. It opposes the top wall 29 of the pump housing 26 and extends in the diameter of the pump housing 26.

The support member 76 has a pair of legs 77a and 77b and a pushing part 78. The first leg 77a has been formed by bending one end portion of the member 76 downwards. The second leg 77b has been formed by bending the other end portion of the member 76 downwards. Both legs 77a and 77b have an L-shaped cross section. The pushing part 78 lies at the center of the support member 76 and protrudes downwards.

Screws 80 fasten the legs 77a and 77b of the support member 76 to a pair of stud pins 79 that are secured to the printed circuit board 13. Since the legs 77a and 77b are so fastened to the board 13, the pushing part 78 abuts on the center part of the top wall 29 of the pump housing 26. The part 78 pushes the bottom wall 28 of the pump housing 26 onto the upper surface of the printed circuit board 13. As a result, the pump 22 is held on the printed circuit board 13.

In the second embodiment described above, the heat that the IC chip 18 generates is transferred via the heat-receiving surface 65 of the housing 61. As mentioned earlier, the housing 61 has the coolant path 66 in which liquid coolant flows. The liquid coolant therefore absorbs a greater part of the heat that has been transferred to the heat-receiving surface 65.

When the impeller 25 of the pump 22 rotates, the liquid coolant is forced from the pump chamber 31 into the coolant path 66 of the heat-receiving portion 60 via the relay pipe 75. The liquid coolant is made to flow through the meandering coolant path 44. While flowing through the coolant path 44, the liquid coolant releases the heat generated by the IC chip 18. The heat diffuses in the first heat-radiating plate 41 and second heat-radiating plate 42. The plates 41 and 42 radiate the heat from their surfaces.

Therefore, the liquid coolant is cooled as it passes through the liquid path 44. The coolant thus cooled is supplied back into the pump chamber 31 of the pump 22 via the second pipe 51. The liquid coolant then flows through the coolant path 66 of the heat-receiving portion 60 via the relay pipe 75. It absorbs the heat of the IC chip 18 again. This cooling cycle is repeated. As a result, the heat is transferred from the IC chip 18 to the heat-radiating portion 23 provided in the display housing 8 and is released from the portable computer 1 via the heat-radiating portion 23.

In the second embodiment, the first pipe 50, which is connected to the coolant outlet port 68 of the heat-receiving portion 60, extends from the first side wall 64a of the housing 61, backwards and slantwise with respect to the heat-receiving portion 60. Thus, the first pipe 50 is oriented toward the middle part of the junction between the housing 4 and the display housing 8. Similarly, the second pipe 51, which is connected to the coolant inlet port 32 of the pump 22, extends from the first wide wall 30a of the pump housing 26, backwards and slantwise, and is oriented toward the middle part of the junction between the housing 4 and the display housing 8.

Therefore, the pipes 50 and 51 only need to run a shortest possible distance to be connected to the coolant inlet port 46 and the coolant outlet port 47, respectively, though the pump 22 is offset to the left from the axis O1 of depth of the housing 4. Hence, both pipes 50 and 51 are shorter than otherwise.

This configuration can minimize the evaporation of the liquid coolant from the pipes 50 and 51 that are made of rubber or synthetic resin. Thus, the second embodiment can achieve the same advantage as the first embodiment.

In the second embodiment, the liquid coolant cooled in the heat-radiating portion is guided to the heat-receiving portion by a pump. Nonetheless, the present invention is not limited to this technical point. For example, the heat-receiving portion and the pump may be switched in position. In this case, the liquid coolant cooled in the heat-radiating portion is guided to the heat-receiving portion, heated in the heat-receiving portion and forced back into the heat-radiating portion by the pump.

Moreover, the shapes of the pump housing and heat-receiving portion are not limited to an octagonal one. Instead, the pump housing and the heat-receiving portion may be, for example, square, pentagonal shape or circular.

The pump may be offset from a midpoint in a width of the pump housing, or set along any suitable area within the electronic apparatus.

Further, the electronic apparatuses according to this invention are not limited to portable computers. Rather, they may be data-processing apparatuses of any other types.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus, comprising:
    a first housing having a heat-generating component;
    a second housing coupled to the first housing;
    a pump incorporated into the first housing having a heat-receiving portion thermally connected to the heat-generating component and offset toward one side of the first housing from a midpoint in a width of the first housing;
    a heat-radiating portion incorporated into the second housing to radiate heat generated by the heat-generating component and having a coolant inlet port and a coolant outlet port; and
    a circulation path to circulate a liquid coolant between the pump and the heat-radiating portion and having a first pipe connecting the pump to the coolant inlet port of the heat-radiating portion and a second pipe connecting the pump to the coolant outlet port of the heat-radiating portion, the first pipe and the second pipe extending from two adjacent points on the pump, toward a midpoint between the coolant inlet port and the coolant outlet port.

2. The electronic apparatus according to claim 1, wherein the pump has a coolant outlet port and a coolant inlet port to which the first pipe and the second pipe are connected, respectively, which are located adjacent to each other and protrude from the pump toward the coolant inlet port and coolant output port of the heat-radiating portion, respectively.

3. The electronic apparatus according to claim 2, wherein the coolant outlet port and the coolant inlet port of the pump extend parallel to each other and are spaced apart from each other.

4. The electronic apparatus according to claim 2, wherein the pump has a polygonal pump housing including a plurality of sidewalls, and the coolant inlet port and the coolant outlet port of the pump protrude from one sidewall of the pump housing and extend parallel to each other.

5. The electronic apparatus according to claim 2, wherein the pump is secured to the first housing by a support member, the support member having a stopper interposed between the coolant outlet port and the coolant inlet port of the pump.

6. The electronic apparatus according to claim 5, wherein the support member resiliently pushes the heat-receiving portion of the pump onto the heat-generating component.

7. An electronic apparatus, comprising:
    a first housing including a heat-generating component;
    a second housing coupled to the first housing;
    a pump incorporated into the first housing having a heat-receiving portion thermally connected to the heat-generating component and offset toward one side of the first housing from a midpoint in a width of the first housing;
    a heat-radiating portion incorporated into the second housing to radiate heat generated by the heat-generating component; and
    a circulation path to circulate a liquid coolant between the pump and the heat-radiating portion and having a first pipe that guides the liquid coolant heated in the heat-receiving portion from the pump to the heat-radiating portion, and a second pipe that guides the liquid coolant cooled in the heat-radiating portion back to the pump, the first pipe and the second pipe extending from two adjacent points on the pump, toward a middle part of a junction between the first housing and the second housing.

8. The electronic apparatus according to claim 7, wherein the heat-radiating portion has a coolant inlet port and a coolant outlet port to which the first pipe and the second pipe are connected, which oppose the junction between the first housing and the second housing and which are spaced apart from each other in a widthwise direction of the second housing.

9. The electronic apparatus according to claim 7, wherein the junction between the first housing and the second housing lies at a middle point in the width of the first housing.

10. The electronic apparatus according to claim 7, wherein the first pipe and the second pipe are rubber tubes having flexibility.

11. An electronic apparatus, comprising:
a first housing including a heat-generating component;
a second housing coupled to the first housing;
a heat-receiving portion incorporated into the first housing thermally connected to the heat-generating component and offset toward one side of the first housing from a midpoint in a width of the first housing;
a heat-radiating portion incorporated into the second housing to radiate heat generated by the heat-generating component, and having a coolant inlet port and a coolant outlet port which are spaced apart from each other in a widthwise direction of the second housing;
a circulation path to circulate a liquid coolant between the heat-receiving portion and the heat-radiating portion; and
a pump incorporated into the first housing to supply the liquid coolant from the circulation path to the heat-radiating portion, offset toward one side of the first housing from a midpoint in the width of the first housing, and located adjacent to the heat-receiving portion,
wherein the circulation path has a first pipe connecting one of the pump and the heat-receiving portion to the coolant inlet port of the heat-radiating portion, and a second pipe connecting an other of the pump and the heat-receiving portion to the coolant outlet port of the heat-radiating portion, the first pipe and the second pipe extending from the pump and the heat-receiving portion, respectively, toward a midpoint between the coolant inlet port and the coolant outlet port.

12. An electronic apparatus, comprising:
a first housing including a heat-generating component;
a second housing coupled to the first housing;
a heat-receiving portion incorporated into the first housing thermally connected to the heat-generating component and offset toward one side of the first housing from a midpoint in a width of the first housing;
a heat-radiating portion incorporated into the second housing to radiate heat generated by the heat-generating component;
a circulation path to circulate a liquid coolant between the heat-receiving portion and the heat-radiating portion; and
a pump incorporated into the first housing to supply the liquid coolant from the circulation path to the heat-radiating portion, offset toward one side of the first housing from the midpoint in the width of the first housing, and located adjacent to the heat-receiving portion,
wherein the circulation path has a first pipe connecting one of the pump and the heat-receiving portion to the heat-radiating portion, and a second pipe connecting an other of the pump and the heat-receiving portion to the heat-radiating portion, the first pipe and the second pipe extending from the pump and the heat-receiving portion, respectively, toward a middle part of a junction between the first housing and the second housing.

13. An electronic apparatus, comprising:
a first housing having a heat-generating component;
a second housing coupled to the first housing;
a pump incorporated into the first housing, having a heat-receiving portion thermally connected to the heat-generating component;
a heat-radiating portion incorporated into the second housing to radiate heat generated by the heat-generating component and having a coolant inlet port and a coolant outlet port; and
a circulation path to circulate a liquid coolant between the pump and the heat-radiating portion and having a first pipe connecting the pump to the coolant inlet port of the heat-radiating portion and a second pipe connecting the pump to the coolant outlet port of the heat-radiating portion, the first pipe and the second pipe extending from two adjacent points on the pump, toward a midpoint between the coolant inlet port and the coolant outlet port.

14. An electronic apparatus, comprising:
a first housing including a heat-generating component;
a second housing coupled to the first housing;
a pump incorporated into the first housing, having a heat-receiving portion thermally connected to the heat-generating component;
a heat-radiating portion incorporated into the second housing to radiate heat generated by the heat-generating component; and
a circulation path to circulate a liquid coolant between the pump and the heat-radiating portion and having a first pipe that guides the liquid coolant heated in the heat-receiving portion from the pump to the heat-radiating portion, and a second pipe that guides the liquid coolant cooled in the heat-radiating portion back to the pump, the first pipe and the second pipe extending from two adjacent points on the pump, toward a middle part of a junction between the first housing and the second housing.

15. An electronic apparatus, comprising:
a first housing including a heat-generating component;
a second housing coupled to the first housing;
a heat-receiving portion incorporated into the first housing, thermally connected to the heat-generating component;
a heat-radiating portion incorporated into the second housing to radiate heat generated by the heat-generating component, and having a coolant inlet port and a coolant outlet port which are spaced apart from each other in a widthwise direction of the second housing;
a circulation path to circulate a liquid coolant between the heat-receiving portion and the heat-radiating portion; and
a pump incorporated into the first housing to supply the liquid coolant from the circulation path to the heat-radiating portion and located adjacent to the heat-receiving portion,
wherein the circulation path has a first pipe connecting one of the pump and the heat-receiving portion to the coolant inlet port of the heat-radiating portion, and a second pipe connecting an other of the pump and the heat-receiving portion to the coolant outlet port of the heat-radiating portion, the first pipe and the second pipe extending from the pump and the heat-receiving portion, respectively, toward a midpoint between the coolant inlet port and the coolant outlet port.

16. An electronic apparatus, comprising:
a first housing including a heat-generating component;
a second housing coupled to the first housing;
a heat-receiving portion incorporated into the first housing, thermally connected to the heat-generating component;

a heat-radiating portion incorporated into the second housing to radiate heat generated by the heat-generating component;

a circulation path to circulate a liquid coolant between the heat-receiving portion and the heat-radiating portion; and a pump incorporated into the first housing to supply the liquid coolant from the circulation path to the heat-radiating portion and located adjacent to the heat-receiving portion, wherein the circulation path has a first pipe connecting one of the pump and the heat-receiving portion to the heat-radiating portion, and a second pipe connecting an other of the pump and the heat-receiving portion to the heat-radiating portion, the first pipe and the second pipe extending from the pump and the heat-receiving portion, respectively, toward a middle part of a junction between the first housing and the second housing.

* * * * *